Oct. 3, 1944. H. KROLL, SR 2,359,316
LOADER
Filed June 7, 1943 2 Sheets-Sheet 2
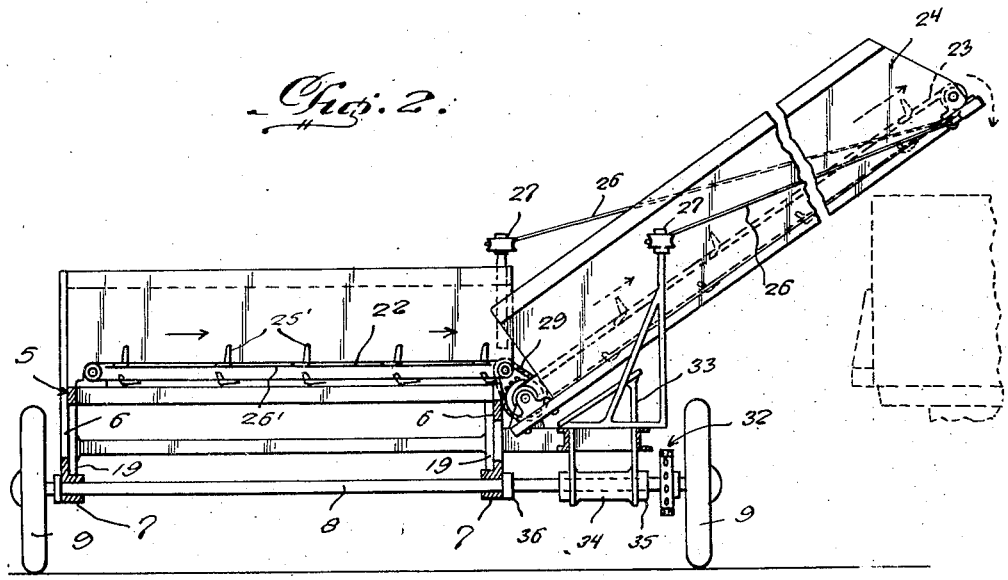
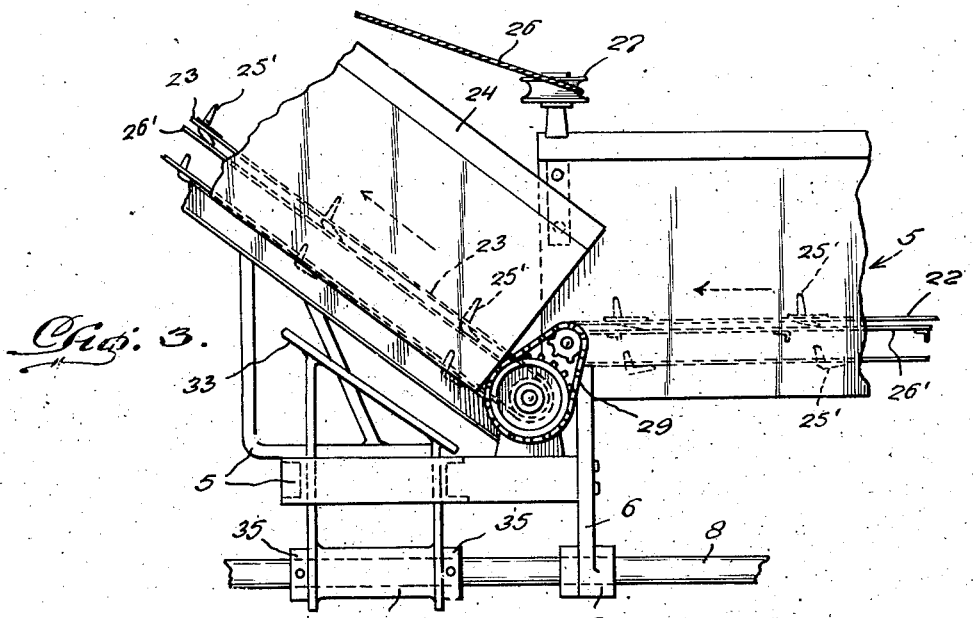
Inventor
Harry Kroll, Sr.

Oct. 3, 1944.   H. KROLL, SR   2,359,316
LOADER
Filed June 7, 1943   2 Sheets-Sheet 1
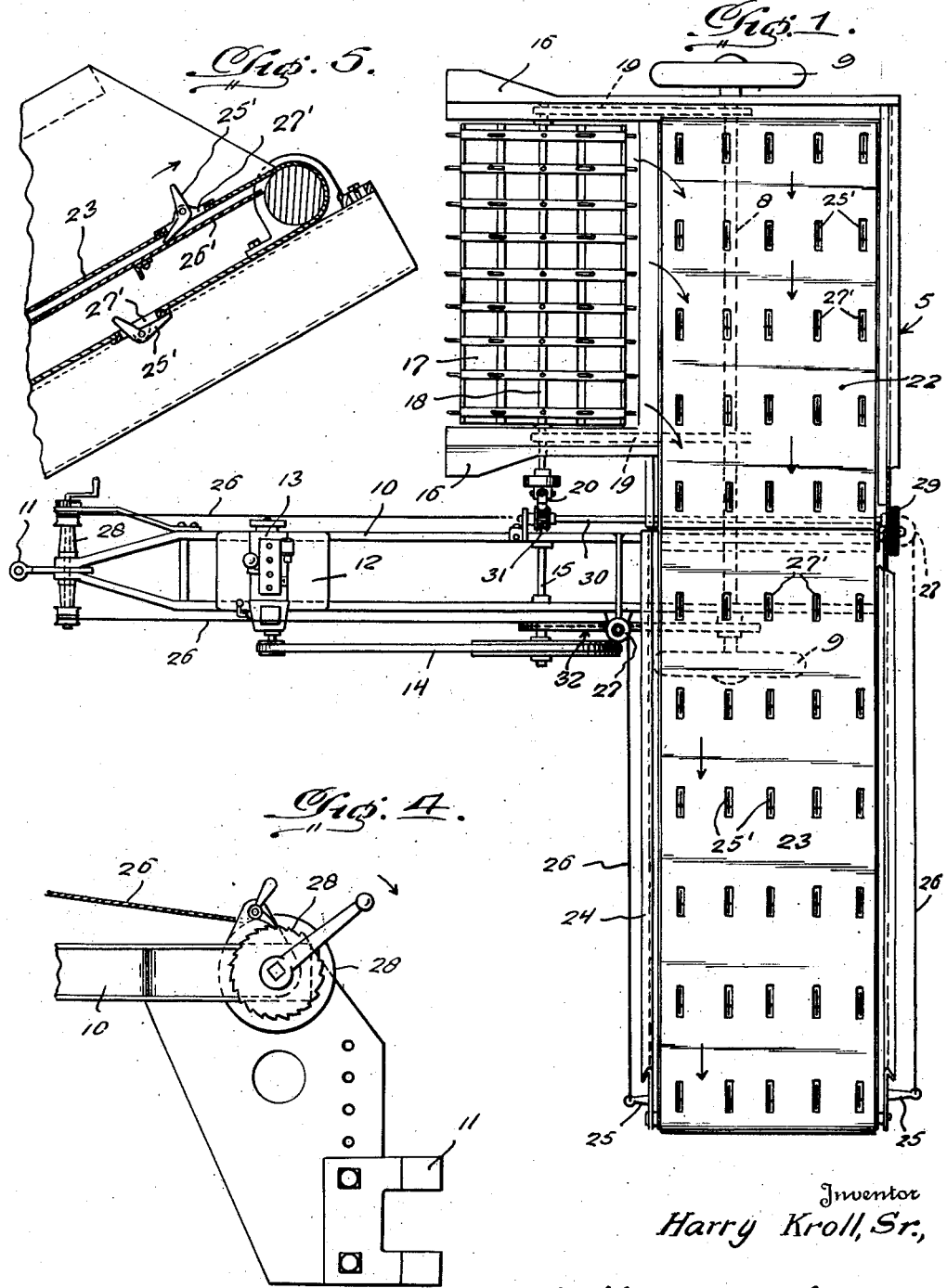
Inventor
Harry Kroll, Sr., Patented Oct. 3, 1944

2,359,316

UNITED STATES PATENT OFFICE 2,359,316

LOADER

Harry Kroll, Sr., Green Bay, Wis.

Application June 7, 1943, Serial No. 489,951

1 Claim. (Cl. 214—83)

This invention relates to a loader especially adapted for gathering and loading into vehicles mowed vegetation, such as green peas, green soy beans, green lima beans and other similar crops, and has for the primary object the provision of a device of the above stated character which will provide a maximum saving in time and labor in bringing mowed crops of the character stated from the field to a place of storage or to a station wherein the beans, peas, or similar vegetation is prepared for the market.

Another object of this invention is the provision of a device of the above stated character which will be simple in operation, durable and efficient and which may be manufactured and sold at a low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view, partly in section, illustrating a loader constructed in accordance with my invention.

Figure 2 is a longitudinal sectional view illustrating the arrangement of the conveyors and the mounting of the main frame on the axle supported by the wheels of the device.

Figure 3 is a fragmentary rear elevation illustrating the drive for the conveyors.

Figure 4 is an enlarged fragmentary view illustrating a winch and its mounting employed for regulating the elevation of the delivery conveyor.

Figure 5 is a fragmentary vertical sectional view, illustrating a portion of the delivery conveyor and showing the fingers or flights of the endless apron thereof.

Referring in detail to the drawings, the numeral 5 indicates a main frame of substantially rectangular shape and preferably constructed of angle iron stock to provide a maximum amount of rigidity thereto. Members 6 integral with the main frame depend therefrom and include journals 7 to rotatably support an axle 8 to which ground wheels 9 are secured. The axle extends longitudinally of the main frame with the wheels positioned beyond the ends of the frame.

Extending forwardly from the main frame 5 adjacent one end thereof is a draft frame 10 provided with a clevis 11 for coupling the draft frame to a tractor or similar device. The draft frame is equipped with a platform 12 forming a support for a prime mover 13 of any desired construction, preferably an internal combustion engine, which is belted, as shown at 14, to a power shaft 15 journaled on the draft frame adjacent the main frame.

Extending forwardly from the main frame 5 are extensions 16 and provide a guard for a rotary type pickup device 17 of a conventional construction and frequently employed in this art for gathering mowed vegetation and includes a shaft 18, journaled between the extensions for free upward and downward movements so that the rotary pickup device can readily follow the unevenness of the ground over which the device moves. The shaft 18 is journaled in arms 19 journaled on the axle. The shaft 18 is joined to the power shaft 15 by a universal joint 20.

A main endless conveyor 22 is supported by the main frame 5 and the upper run thereof is adapted to receive the vegetation picked up by the pickup device 17 and convey the vegetation toward one end of the main frame for delivery onto an endless delivery conveyor 23 mounted for hinging movement at said latter-named end of the main frame.

The endless conveyor 23 is supported by an auxiliary frame 24 carrying extensions 25 adjacent the free end to which cables 26 are connected. The cables are trained over guide pulleys 27 and secured to and wound on a winch 28 carried by the forward end of the draft frame whereby the auxiliary frame and the conveyor 23 carried thereby may be raised and lowered so that its free end may be brought a desired distance over and from vehicles of different heights employed in hauling vegetation from the field after being gathered by the device. The endless conveyor 23 is mounted on rollers journaled on the auxiliary frame 24 and one of said rollers is driven from a roller acting as a support for one end of the conveyor 22, the other end of said conveyor being supported by a roller journaled in the frame 5. The driving connection between the rollers and the conveyors 22 and 23 is in the form of sprocket gears and an endless sprocket chain indicated generally by the character 29.

The roller of the endless conveyor 22 which carries one of the rollers of the endless conveyor 23 is secured to a shaft 30 journaled on the main frame 5 and the draft frame and is geared to the power shaft 15, as shown at 31.

The conveyors 22 and 23 include pivoted fingers or flights 25' of substantially L shape and which are retained in load carrying position by plates 26' during their movement with the upper runs of said conveyors and may assume inoperative position when moving with the lower runs of the conveyors. The conveyors have metallic bound slots, as shown at 27', in which the fingers or flights are pivotally mounted.

A drive medium 32 in the form of sprocket gears and a sprocket chain is provided between the axle 8 and the shaft 15.

An inclined rest 33 is provided on the main frame and underlies the auxiliary conveyor frame for the purpose of limiting the downward movement of the delivery conveyor. The rest 33 includes depending portions fastened on the main frame and carry a journal 34 which receives the axle 8. Stop collars 35 engage opposite ends of the journal 34 and are secured to the axle to restrict the endwise movement of the axle 8 in the bearings 7. Stop collars 36 also may be employed on the axle 8 to engage with the bearings 7 to further assist in limiting the endwise movement of the axle in the bearings 7.

It will be seen from the foregoing description taken in connection with the accompanying drawings, that a very practical, durable and efficient loading device has been provided capable of clearing large areas of mowed vegetation within a minimum length of time and delivering said vegetation to a vehicle accompanying the device. Also it will be seen that the device is readily operable from a tractor or similar draft medium and that its propulsion may be from the prime mover carried thereby and thereby relieving the tractor or similar device of the full strain of the load created by the device.

While I have shown and described the preferred embodiment of my invention, it will be understood that minor changes in construction, combination and arrangement of parts may be made without departing from the spirit and scope of the invention as claimed.

Having thus described the invention, what I claim is:

In a loader, an elongated main frame, an endless conveyor including shafts journaled on said frame adjacent the ends thereof to permit travel of the conveyor endwise of said frame, depending members formed on the frame at the ends of the latter, an axle rotatably supported by said members longitudinally of and in a plane below the frame with the ends of the axle terminating beyond the ends of the frame, ground wheels secured on the axle beyond the ends of the frame, a gathering mechanism mounted for upward and downward movements on the axle and arranged in front of the frame for delivering material onto the conveyor, guides for the gathering mechanism secured to and projecting forwardly of the frame, a rigid draft hitch member secured to the frame at one end of the gathering mechanism and extending forwardly of the latter, a sub-frame secured to one end of the main frame and located in a plane below the latter and above the axle and between the frame and one of the ground wheels, a delivery device including a conveyor and shafts therefor, means journaling one of the latter-named shafts on the sub-frame close to the main frame and providing a pivot for the delivery device to permit the latter to swing upwardly and downwardly over the latter-named wheel, a raising and lowering means supported by the draft hitch member and connected to the delivery device, a flexible drive connecting shafts of the conveyors, a power shaft supported by the draft hitch member, drive means connecting the power shaft to the axle, flexible drive means connecting the power shaft to the gathering mechanism, and a power source carried by the draft hitch member and connected to the power shaft.

HARRY KROLL, Sr.